Oct. 4, 1955 R. B. COPAS ET AL 2,719,640
RACK FOR A WHEELED VEHICLE
Filed May 1, 1953

INVENTORS
ROBERT B. COPAS
& JERRY KOSTYO
BY
RICHEY, WATTS, EDGERTON & McNENNY
A.H. Edgerton
ATTORNEYS

United States Patent Office 2,719,640
Patented Oct. 4, 1955

2,719,640
RACK FOR A WHEELED VEHICLE

Robert B. Copas and Jerry Kostyo, Elyria, Ohio

Application May 1, 1953, Serial No. 352,464

3 Claims. (Cl. 214—372)

This invention relates broadly to improvements in racks for the support of prismoidal bodies in stacked relation thereon, and more specifically to a rack or article-holding frame which is designed for ready attachment to a dolly or other vehicle to facilitate the transportation thereof.

In detail, the rack comprises a plate for the reception of the articles loaded thereon and a stanchion secured upon one side thereof in normal relation thereto. The stanchion is provided with a latch and centering rail to implement the attachment of the rack to a dolly. The utility and object of the invention are similar to that of a lift truck pallet in that articles such as beverage cases may be stacked upon the plate as it rests upon the floor and held in storage until required. When it is desired to move a loaded rack a dolly may be connected thereto and the load transferred in the usual manner to a new location.

Further objects of the invention reside in the provision of a rack which is economic of manufacture, sturdy of structure, durable, and efficient of operation.

Other objects and advantages more or less ancillary to the foregoing, and the manner in which all the various objects are realized will appear in the following description, which, considered in connection with the accompanying drawings, sets forth the preferred embodiment of the invention.

Referring to the drawings.

Figure 4:
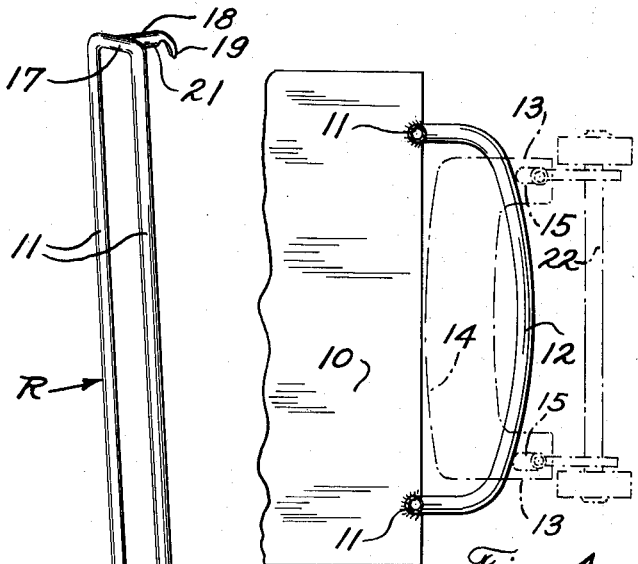
Fig. 4 is a transverse sectional view of the rack, the section being taken on a plane indicated by the line 4—4 in Fig. 3.
Figure 1:
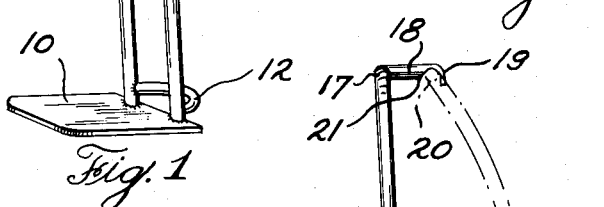
Fig. 1 is a view in perspective of the improved rack.
Figure 2:
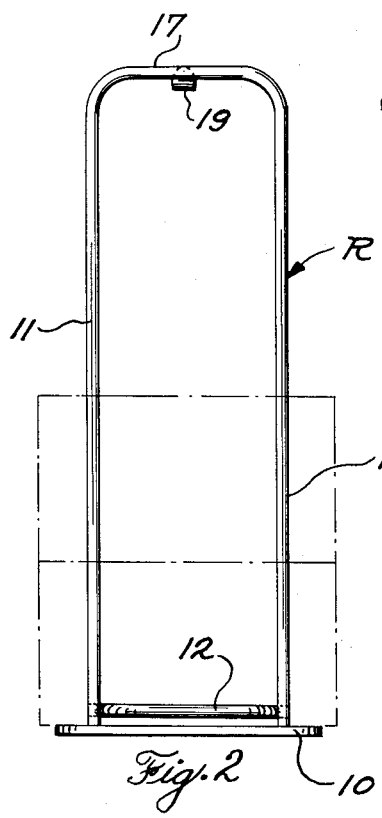
Fig. 2 is a front elevational view thereof.
Figure 3:
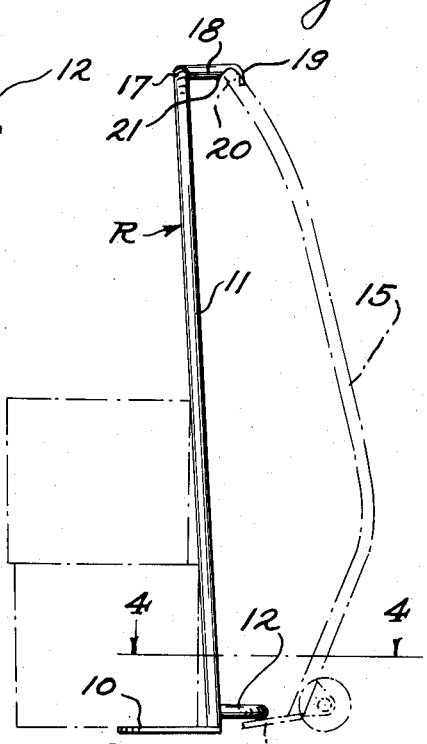
Fig. 3 is a side elevational view of the rack and a dolly shown in dotted lines in engaged relation therewith.

Referring first to Fig. 1, the rack or frame R comprises a flat sheet metal plate 10 having a stanchion 11 mounted adjacent the edge of one side thereof in normal relation thereto. The stanchion is in the form of a loop reinforced in the lower portion thereof with an arcuate cross bar 12 adapted for abutting engagement with the arms 13 of the toe plate 14 of a dolly 15. The cross bar 12 is struck from a radius of suitable length to support the stanchion in spaced relation with the frame members or handle of the dolly and at the same time restrain lateral movement thereof when the vehicle is in transit. The upper looped end 17 of the stanchion is provided with an arm 18 rigidly secured thereto and formed with a hook 19 in the free ends thereof for engagement with a cross rail 20 on the dolly. The inner edge of the hook is machined with an abrupt shoulder 21 thereon to prevent accidental separation of the hook from its keeper when the dolly is hauled over rough, irregular floor areas.

In operation, merchandise of a character that may be readily stacked is placed in superposed relation upon the plate 10 as it rests upon the floor, the rearward edge thereof being pressed into intimate engagement with the stanchion 11. The dolly 15 is next brought into proximity therewith and tilted vertically to effect the engagement of the cross rail 20 therewith. The operator may then place his foot upon the axle 22 of the dolly to arrest translation thereof and simultaneously lower the handle of the truck into hauling position, whereupon the arcuate cross bar 12 on the rack will engage the arms 13 of the toe plate and float the rack into centered relation with the dolly.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. A material supporting rack for attachment upon a wheel vehicle comprising a plate, an upright secured upon one edge thereof, a hook in the upper end thereof for engagement with a keeper on the vehicle, and an arcuate centering bar on said upright adjacent the base thereof for engagement with parallel arms on the base of the vehicle.

2. A material holding rack for suspension on a dolly comprising a flat rectangular plate for the support of the material, a stanchion thereon disposed in normal relation thereto, a hook adjacent the top thereof adapted for engagement with a cross rail on the dolly and an arcuate bar adjacent the base of the stanchion engageable with spaced members on the dolly to restrain transverse movement of the rack.

3. In combination with a dolly embodying a cross rail on the handle frame thereof and parallel arms on the toe plate, an article supporting rack adapted for attachment thereto comprising a load carrying plate, an upright thereon, a hook adjacent the top thereof engaged with the cross rail on the dolly, and a curved bar adjacent the base of the upright abutting the parallel arms on the toe plate.

References Cited in the file of this patent

UNITED STATES PATENTS

| 1,438,334 | Sabin | Dec. 12, 1922 |
| 1,807,128 | Munoz et al. | May 26, 1931 |
| 2,432,368 | Avril | Dec. 9, 1947 |